(12) United States Patent
Duckett

(10) Patent No.: US 7,752,345 B2
(45) Date of Patent: Jul. 6, 2010

(54) AUTOMATIC CONFIGURATION OF NETWORK DEVICES

(75) Inventor: Jeanne F. Duckett, Franklin, OH (US)

(73) Assignee: Avery Dennison Corporation, Miamisburg, OH (US)

( * ) Notice: Subject to any disclaimer, the term of this patent is extended or adjusted under 35 U.S.C. 154(b) by 93 days.

(21) Appl. No.: 11/961,680

(22) Filed: Dec. 20, 2007

(65) Prior Publication Data

US 2009/0164668 A1  Jun. 25, 2009

(51) Int. Cl.
- *G06F 3/12* (2006.01)
- *G06F 15/177* (2006.01)
- *G06F 15/16* (2006.01)
- *G06F 3/00* (2006.01)

(52) U.S. Cl. .......................... 710/8; 358/1.15; 709/220; 709/222; 709/227; 709/228; 709/245; 710/3; 710/9; 710/10

(58) Field of Classification Search .................. 358/1.1, 358/1.15; 709/220–222, 227, 228, 230, 245; 710/1, 3, 4, 8, 9, 10

See application file for complete search history.

(56) References Cited

U.S. PATENT DOCUMENTS

| | | | |
|---|---|---|---|
| 4,408,906 A | 10/1983 | Wallace | |
| 5,692,111 A | 11/1997 | Marbry et al. | |
| 5,833,377 A | 11/1998 | Keller et al. | |
| 5,875,306 A | 2/1999 | Bereiter | |
| 5,960,167 A | 9/1999 | Roberts et al. | |
| 6,012,088 A * | 1/2000 | Li et al. ........................ | 709/219 |
| 6,241,407 B1 | 6/2001 | Huggins et al. | |
| 6,246,326 B1 | 6/2001 | Wiklof et al. | |
| 6,301,012 B1 | 10/2001 | White et al. | |
| 6,430,612 B1 | 8/2002 | Iizuka | |
| 6,496,511 B1 | 12/2002 | Wang et al. | |
| 6,681,392 B1 | 1/2004 | Henry et al. | |
| 6,693,722 B1 | 2/2004 | Mixer, Jr. | |
| 6,795,846 B1 | 9/2004 | Merriam | |
| 6,922,723 B1 | 7/2005 | Sharp et al. | |
| 7,126,716 B1 | 10/2006 | Kaufman et al. | |

(Continued)

OTHER PUBLICATIONS

Zero PC Administration Capabilities of ON Command CCM Enhanced by New Inventory and Remote Control Applications from Tally Systems and Funk Software, PR Newswire, Jan. 13, 1998.

(Continued)

*Primary Examiner*—Alford W Kindred
*Assistant Examiner*—Richard Franklin

(57) ABSTRACT

Aspects of the invention relate to methods for automatically configuring a device and a device capable of being automatically configured. According to one embodiment the device is a printer and a dynamic IP address is obtained using a wired connection; a connection is established with a server using the wired connection and the dynamic IP address; configuration information is downloaded from the server; a static IP address is assigned to the printer using the configuration information; and a connection is established with a server using a wireless connection and the static IP address. The configuration information may include setting information and address information. The setting information may be used to configure the settings of the printer and the address information may be used to assign a static IP address to the printer. The configuration information may include information relating to a wireless network.

33 Claims, 14 Drawing Sheets

U.S. PATENT DOCUMENTS

| | | | | |
|---|---|---|---|---|
| 7,177,957 | B2* | 2/2007 | Vance | 710/13 |
| 2001/0029857 | A1 | 10/2001 | Heredia et al. | |
| 2004/0100381 | A1 | 5/2004 | Waters | |
| 2004/0143651 | A1 | 7/2004 | Allen et al. | |
| 2004/0184070 | A1 | 9/2004 | Kiraly et al. | |
| 2004/0259533 | A1 | 12/2004 | Nixon et al. | |
| 2005/0116034 | A1 | 6/2005 | Satake et al. | |
| 2005/0132028 | A1 | 6/2005 | Lester et al. | |
| 2005/0200883 | A1 | 9/2005 | Mannion | |
| 2005/0270989 | A1 | 12/2005 | Park et al. | |
| 2005/0274800 | A1 | 12/2005 | Chapman et al. | |
| 2005/0280537 | A1 | 12/2005 | Feltz et al. | |
| 2006/0173979 | A1 | 8/2006 | Roellgen | |
| 2006/0221363 | A1 | 10/2006 | Roth et al. | |
| 2007/0036358 | A1* | 2/2007 | Nguyen et al. | 380/270 |
| 2008/0034077 | A1* | 2/2008 | Takashige et al. | 709/223 |

OTHER PUBLICATIONS

MTX, Inc. Announces the New Network-Ready 1500 Series Line Matrix Printer Family, PR Newswire, p. 2526, Jan. 5, 1999.

Zebra Introduces New XiIII Industrial Bar Code Label Printers, PR Newswire, p. 9398, Oct. 1999.

Zebra Technologies Introduces ZebraLink Printer Connectivity and Control Solution, Business Wire, p. 2609, Oct. 4, 2000.

Aichlmayr, M., "Get Mobile, Go Wireless: Wireless Printing is One Innovation to Enhance Warehouse Flexibility (Distribution Management)", Transportation & Distribution, vol. 43, No. 9, pp. 28(5), Sep. 2002.

Passmore, D., "Zero Configuration Networks (Networks Architect)", Business Communications Review, Oct. 1, 2002.

Printronix Solutions, retrieved from www.printronix.com, copyright, 2006.

"HP Web Jetadmin 8.1 Reviewer/Evaluator's Guide", retrieved from www.hp.com, copyright, 2004-2006.

* cited by examiner

```
[NCL_START]
Log = "File description"
Log = "Date and time or version info"

[Flash]
Save = 1

[FileXfr]
IPAddr = %IPCalc(%IPA & %SNM)
FTP_User = "StoreChain"
FTP_Password = "Secret"
FTP_Path = IPDatabase.txt

[NCL_END]
```

Figure 6

| PRINTER ID | IP ADDRESS |
|---|---|
| ABCD01 | 192.168.0.100 |
| ABCD02 | 192.168.0.101 |
| ABCD03 | 192.168.0.102 |
| ABCD04 | 192.168.0.103 |
| ABCD05 | 192.168.0.104 |
| ABCD06 | 192.168.0.105 |
|  |  |
|  |  |
|  |  |

FIGURE 9

| NETWORK ID | StoreChainID1234 |
|---|---|
| PASSWORD | 9A12BE34CA |
| SETTINGS |  |
|  |  |
|  |  |

FIGURE 10

```
[NCL_START]
Log = "File description"
Log = "Date and time or version info"

[StoreChain]
Available = 1
<Block_Start>
1
2
3
4
5
<Block_End>
Used = 1
<Block_Start>
<Block_End>

IPAddr = %IPCalc(%IPA & %SNM)
FTP_User = "StoreChain"
FTP_Password = "Secret"
FTP_Patch = IPDatabase.txt

[FlieXfr]
IPAddr = %IPCalc(%IPA & %SNM)
FTP_User = "StoreChain"
FTP_Password = "Secret"
FTP_Path = StoreIDLookup.txt

[NCL_END]
```

FIGURE 11

```
[NCL_START]
Log = "File description"
Log = "Date and tome or version info"

[StoreChain]
StoreID = 1
<Block_Start>
1.24.47.128, TKT00RL123
1.23.44.128, TKT00RL124
1.23.45.128, TKT00RL125
1.27.45.128, TKT00XX123
1.25.46.128, TKT00XX124
1.22.41.128, TKT00XX125
...
<Block_End>

[NIC.TCPIP.7411]
IPAddr = %IPCalc(%IPB + 11 + %PRN)
Gateway = %IPCalc(%IPB + 5)
NetID = %Cat(%SID + %I2S(%PRN, 2, "0"))
Mode = Static
...

[FileXfr]
IPAddr = %IPCalc(%IPA & SNM)
FTP_User = "StoreChain"
FTP_Password = "Secret"
FTP_Path = Flash.txt
FTP_Path = Config.txt

[NCL_END]
```

FIGURE 12

```
[NCL_START]
Log = "File Description"
Log = "Date and time or version info"

[FLASH]
Save = 1

[FileXfr]
IPAddr = %IPCalc(%IPA & %SNM)
FTP_User = "StoreChain"
FTP_Password = "Secret"
FTP_Path = Config.txt

[NCL_END]
```

FIGURE 13

```
[NCL_START]
Log = "File description"
Log = "Date and time of version info"

[NIC.TCPIP.7411]
...
[Printer.9855]
...
[FileXfr]
IPAddr = %IPCalc(%IPA & &SNM)
FTP_User = "Polo"
FTP_Password = "Secret"
FTP_Path = Formats.txt

[NCL_END]
```

FIGURE 14

AUTOMATIC CONFIGURATION OF NETWORK DEVICES

TECHNICAL FIELD

Aspects of the invention relate to methods for configuring devices and devices capable of being configured. More particularly, aspects of the invention relate to methods for automatically configuring a printer and a printer that can be configured automatically.

BACKGROUND

Many business organizations comprise a number of locations. These locations may be stores, depots, warehouses, offices, or a combination thereof, for example. The locations may be spread throughout a state, a country or the world, for example. The locations are often connected to a computer network such as a Local Area Network (LAN) or a Wide Area Network (WAN). The networks may comprise wired and wireless components.

Computer devices are common place in many businesses. By way of example, and not limitation, computer devices may comprise printers, cameras, laptop computers, desktop computers, scanners. It many cases it is necessary for these devices to work on a computer network such as a LAN or WAN. If a business has a number of locations then it may be necessary for all computer devices within that business to work on the same network.

When computer devices are purchased they are often not configured to work on a particular network. In order for them to work on a particular network they often must be manually configured. This configuration can be complicated and it is often necessary for it to be carried out by skilled personnel. If there is no skilled person at the particular location where the device is intended to work then it is necessary for someone to travel from another location in order to configure the device. This is obviously undesirable.

Further, secure wireless networks are becoming widely used in order to allow network devices to be used wirelessly. It is often more difficult to configure a device to work on a secure wireless network as opposed to a wired network. One example of a wireless device that can be used on a secure wireless network is a printer. It is desirable to be able to configure a wireless device to work on a secure wireless network with little specialized knowledge. Further, it is desirable that as few people as possible have access to the details of the secure wireless network.

In some circumstances it is desirable to configure a device differently, depending on where it is to be used. For example, Store A might require Configuration A, whereas Store B might require Configuration B. This means that manually configuring a device can be time consuming and labor intensive.

BRIEF SUMMARY

Aspects of the invention relate to systems and methods for configuring a device, such as a printer. According to one embodiment, a dynamic IP address is obtained using a wired connection; a connection is established with a server using the wired connection and the dynamic IP address; configuration information is downloaded from the server; a static IP address is assigned to the printer using the configuration information; and a connection is established with a server using a wireless connection and the static IP address.

The configuration information may include setting information and address information. The setting information may be used to configure the settings of the printer and the address information may be used to assign a static IP address to the printer. The configuration information may include information relating to a wireless network.

Further embodiments are directed towards updating setting information stored on the printer comprising: downloading setting information from the server and replacing the setting information stored on the printer with the downloaded setting information. The setting information stored on the printer may only be replaced with the downloaded setting information if the setting information stored on the printer is different to the downloaded setting information.

Further aspects of the invention relate to a printer, comprising: a wired connection port; a wireless transceiver; a processor; and a computer-readable medium having computer-readable instructions, that when executed by the processor perform a method comprising: obtaining a dynamic IP address using a wired connection provided via the wired connection port; establishing a connection with a server using the wired connection and the dynamic IP address; downloading configuration information from the server; assigning a static IP address to the printer using the configuration information; and establishing a connection with a server using a wireless connection, provided via the wireless transceiver, and the static IP address.

Still yet further aspects of the invention relate to computer-readable mediums having computer-readable instructions that when executed perform methods for configuring a device.

As will be apparent to one skilled in the art, any device may be configured according to the methods disclosed herein. This disclosure is not intended to limit the configurable device to a printer.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 6 is an example of an NCL flash file consistent with certain embodiments of the invention.

FIG. 9 is a table showing address information consistent with certain embodiments of the invention.

FIG. 10 is a table showing configuration information consistent with certain embodiments of the invention.

FIG. 11 is an example of a file for configuring a printer consistent with certain embodiments of the invention.

FIG. 12 is an example of a store look-up table consistent with certain embodiments of the invention.

FIG. 13 is an example of a printer flash file consistent with certain embodiments of the invention.

FIG. 14 is an example of a printer configuration file consistent with certain embodiments of the invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention. It is further noted that various connections are set forth between elements in the following description. It is noted that these connections in general and, unless specified otherwise, may be direct or indirect and that this specification is not intended to be limiting in this respect.

Aspects of the present invention are suitable for use in an environment of networked computer devices. Embodiments of the present invention may comprise special purpose and/or general purpose computer devices that each may include standard computer hardware, such as a central processing unit (CPU) or other processing means for executing computer executable instructions, computer readable media for storing executable instructions, a display or other output means for displaying or outputting information, a keyboard or other input means for imputing information, and so forth. Examples of suitable computer devices may include handheld devices, multiprocessor systems, microprocessor-based or programmable consumer electronics, network PCS, mini-computers, mainframe computers, and the like.

The above-mentioned computer readable media can be any available media which can be accessed by a general purpose or special purpose computer. By way of example, and not limitation, such computer readable media can comprise RAM, ROM, EEPROM, CD-ROM or other optical disc storage, magnetic disk storage or other magnetic storage devices, or any other media which can be use to store the desired executable instructions and which can be accessed by a general purpose and special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
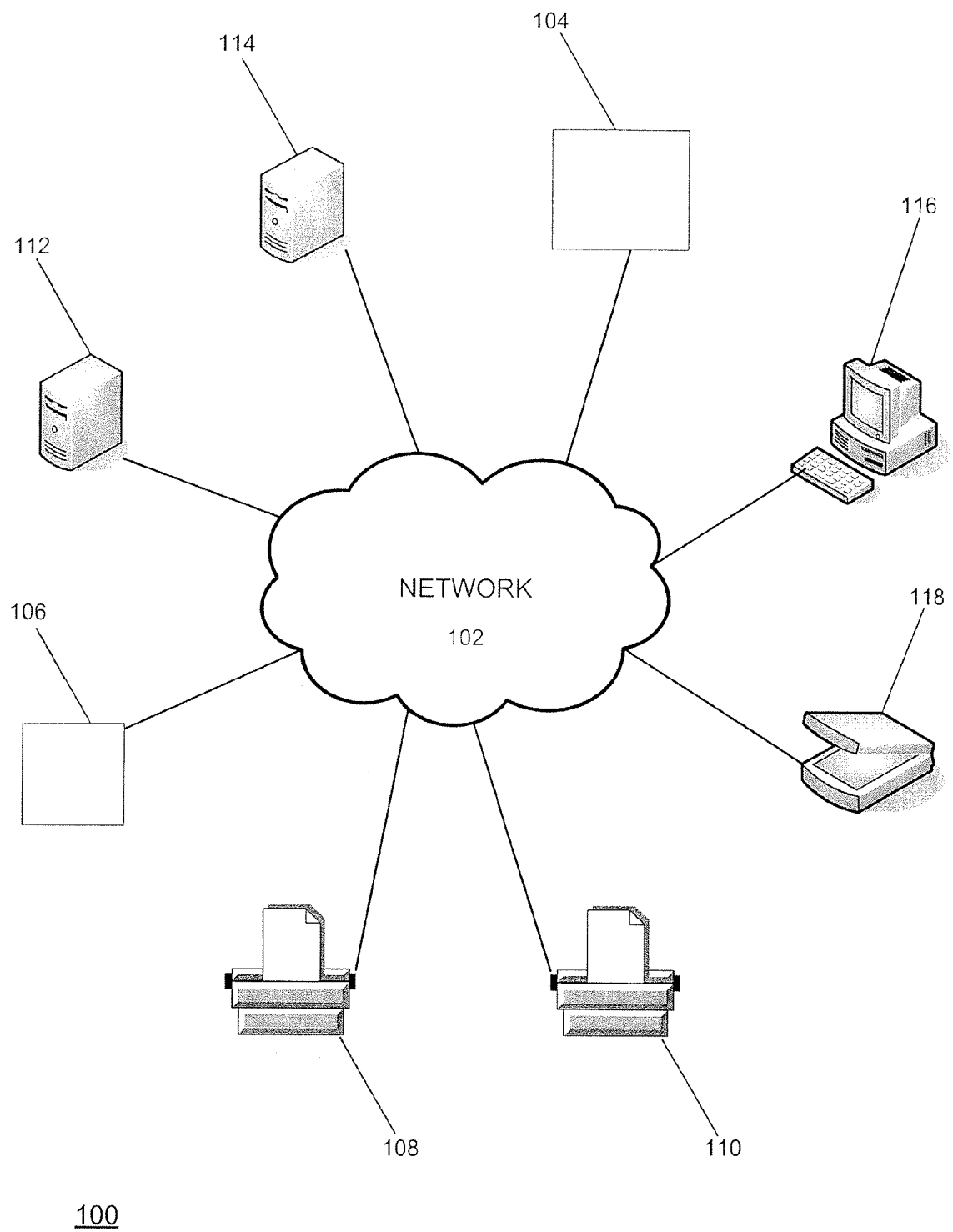
FIG. 1 is a diagram of an exemplary operating environment that may be utilized in implementing one or more aspects of the invention.

FIG. 1 illustrates an exemplary operating environment in which certain aspects of the invention may be implemented. System 100 is only one example of a suitable operating environment and is not intended to suggest any limitation as to the scope of use or functionality of the invention. System 100 is shown as including a communications network 102. The specific network implementation used can be comprised of, for example, any type of local area network (LAN), including wireless area networks (WLAN), and associated LAN topologies and protocols; simple point-to-point networks (such as direct modem-to-modem connection); and wide are network (WAN) implementations, including public Internets and commercial based network services. Systems may also include more than one communication network, such as a LAN coupled to the Internet.

Elements 104 and 106 which may be separate computer devices or combined devices may be coupled to communications network 102 through communication devices. Network interface adapters, such as a network interface controller (NIC) or a wireless network interface controller (WNIC) for example, may be used to connect computer devices 104 and 106 to a LAN. Elements 104 and 106 may have more than one network interface controller, such as a NIC and a WNIC, for example. When communications network 102 includes a WAN, modems or other means for establishing a communications over WANs may be utilized. Computer devices 104 and 106 may communicate with one another via communication network 102 in ways that are well known in the art. The existence of any of various well-known protocols, such as TCP/IP, Ethernet, FTP, TFTP, HTTP and the like, is presumed.

By way of example, and not limitation, elements 104 and 106 can comprise a printer 108, 110; a server 112, 114; a personal computer 116; a scanner 118. These elements may exchange content, applications, messages and other objects via communications network 102.

Figure 2:
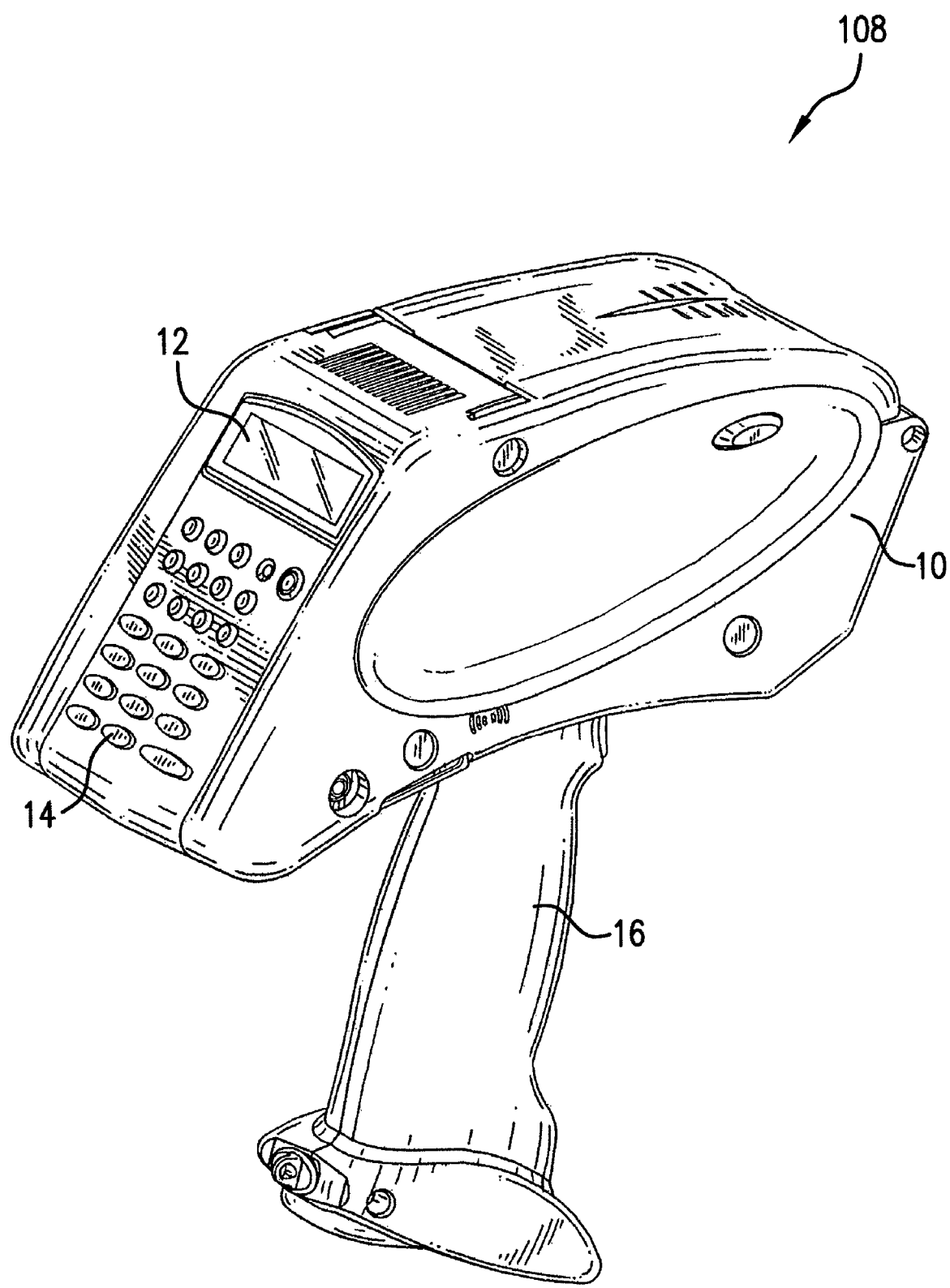
FIG. 2 is a schematic perspective view of a handheld printer consistent with certain embodiments of the invention.

FIG. 2 shows a handheld printer 108 in accordance with a first embodiment of the invention. The handheld printer comprises a body 10, a display 12, a keypad 14 and a handle 16. The display 12 and keypad 14 are mounted to the body 10. The handle 16 is ergonomically shaped so as to conform to the hand of a user and is mounted to the body 16.

Figure 3:
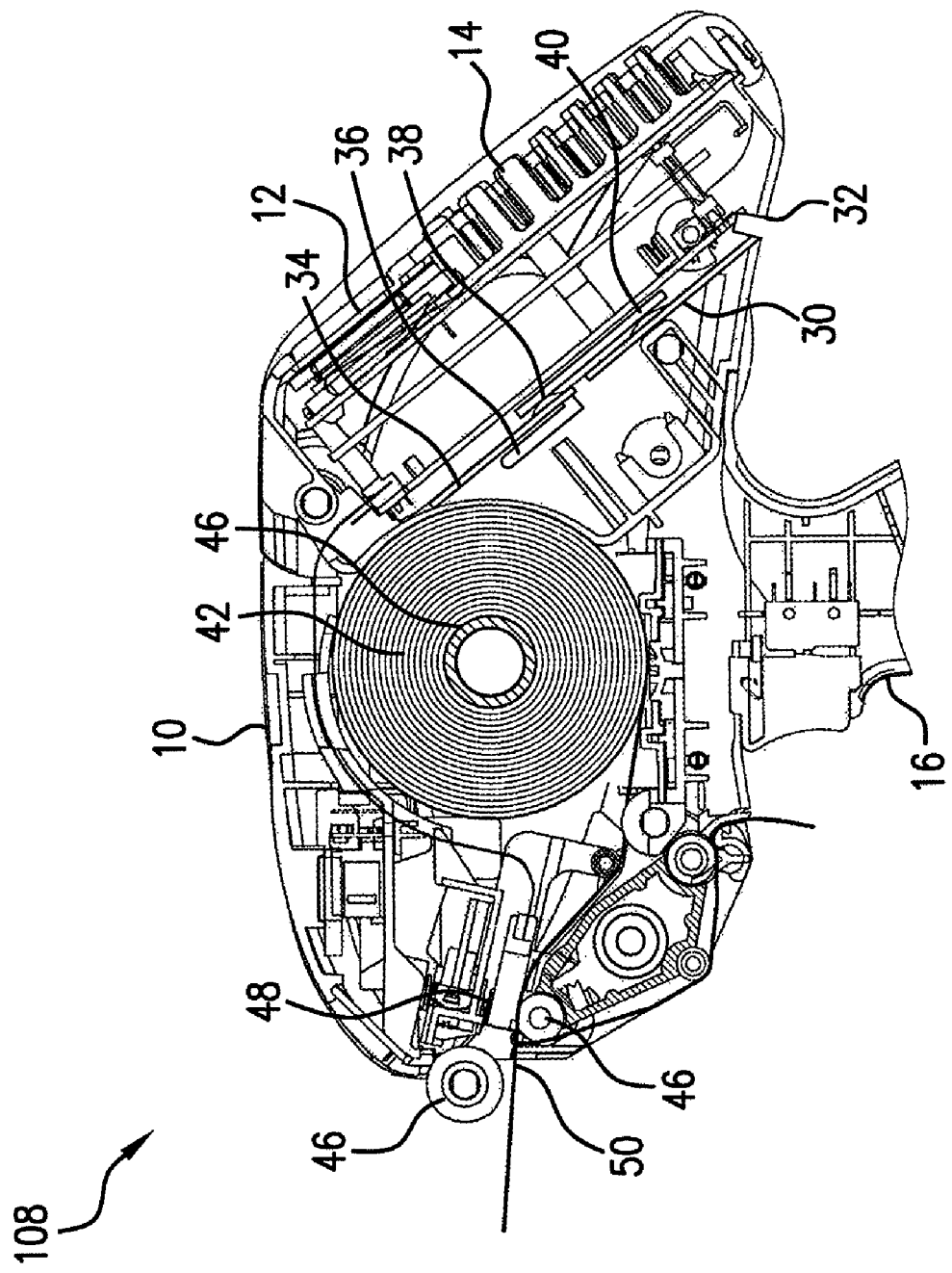
FIG. 3 is a schematic view of the inside of a handheld printer consistent with certain embodiments of the invention.
Figure 5:
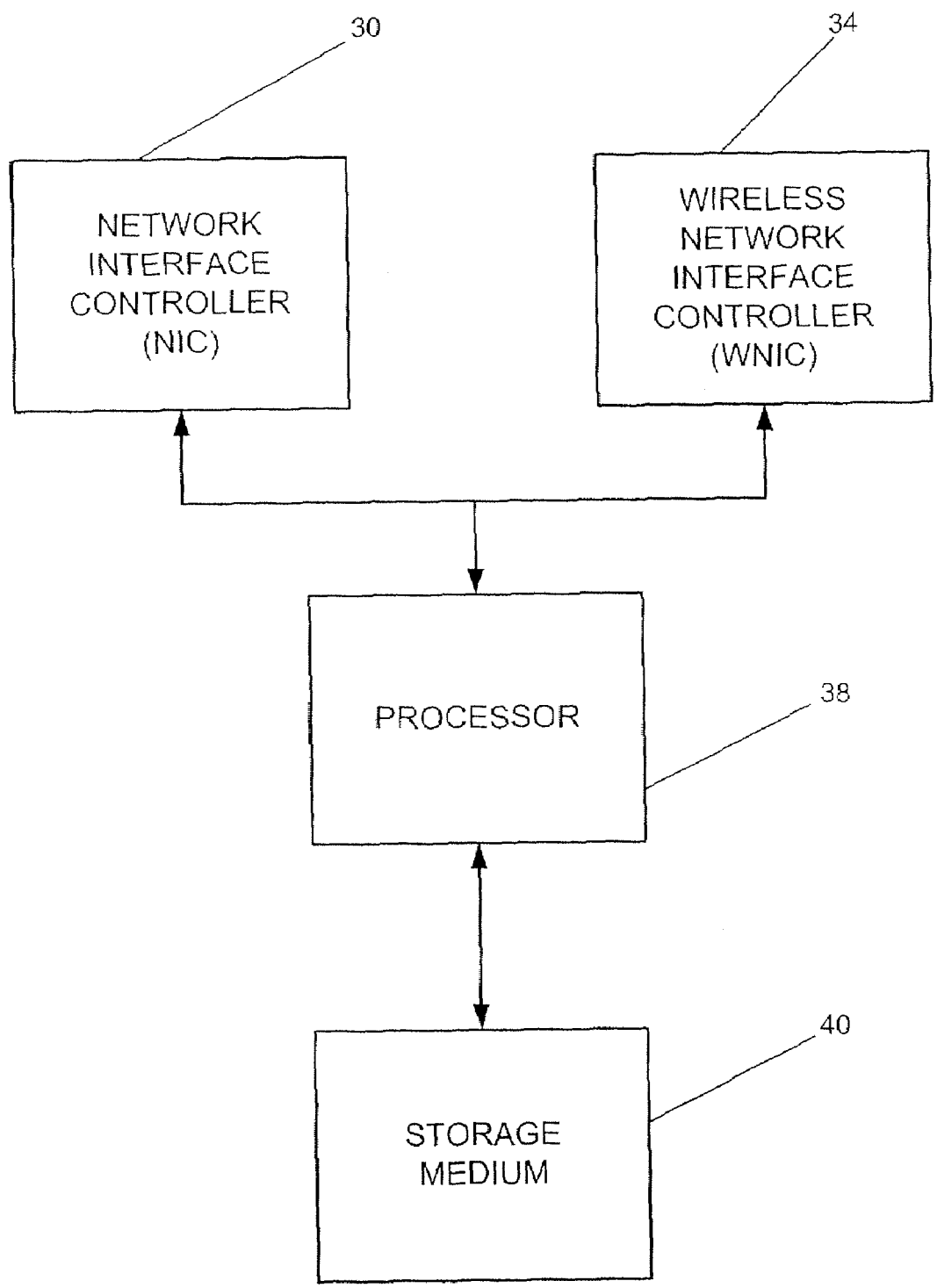
FIG. 5 is a block diagram of the components of a device consistent with certain embodiments of the invention.

FIG. 3 shows a cross-sectional view of the printer 118. The printer 118 comprises a network interface controller (NIC) 30 having a wired port 32 (for example an RJ45 Ethernet port), a wireless network interface controller (WNIC) 34 (for example IEEE 802.11g. having an operating frequency of 2.4 GHz) having an antenna 36 for transmitting and receiving signals. The printer 108 further comprises a processor 38 and a computer-readable storage device 40. FIG. 5 shows a block diagram of a possible configuration of these elements. The NIC 30 and WNIC 34 are in communication with the processor 38 which is turn is in communication with the storage device 40. The printer also comprises a web of printable substrate 42, a spindle 44 for mounting the web of substrate, a series of print rollers 46, a print head 48 and a print opening 50.

Figure 4:
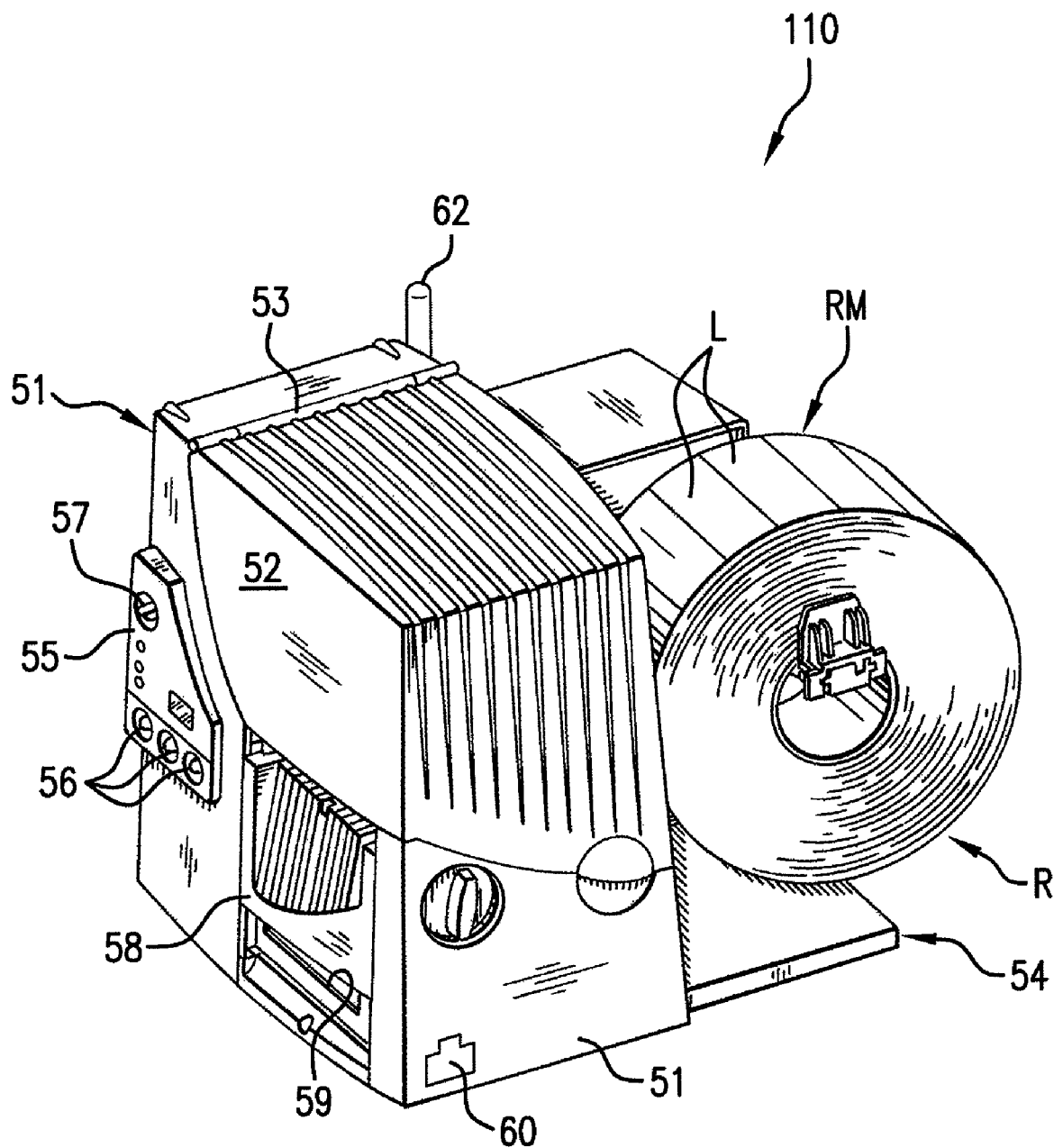
FIG. 4 is a schematic perspective view of a printer consistent with certain embodiments of the invention.

The physical structure of the printer may be that disclosed in U.S. Pat. No. 5,833,377 which is incorporated herein by reference in its entirety. This printer is schematically illustrated in FIG. 4. There is shown a printer generally indicated at 110 having a housing 51 with cover 52 pivotally mounted at a hinge 53. The printer 110 also includes a frame 54. A roll R of a web of record members RM is mounted on the frame 54. The housing 51 has a control panel 55 having various control buttons 56 and a latch control knob 57. The housing 51 has a movable panel 58 with an exit opening 59. The panel 58 is pivotally mounted from a closed latched position to an open position shown. The printer also includes network interface controller (NIC) having a wired port 60 (for example an RJ45 Ethernet port) and a wireless network interface controller (WNIC) (for example IEEE 802.11 g. having an operating frequency of 2.4 GHz) having an antenna 62 for transmitting and receiving signals.

The printer may be suitable for use in one of a plurality of stores, for example, a specific store within a chain of stores. It will be readily apparent to one skilled in the art that the printer, or other device, may be suitable for use in any other location, for example an office, warehouse, depot or domestic location.

The handheld printer may work in a number of ways. It may be possible to print from the printer using the keypad 14. For example, the storage device 40 may have printable files stored on it which can be selected and printed by using the keypad 14. Alternatively, data signals may be received by the NIC 30 and/or WNIC 34 which cause the printer 108 to print. In other embodiments, data received by the NIC 30 and/or WNIC 34 may be stored in the storage device 40 and then later printed by using the keypad 14. Data received by the printer via the NIC 30 and/or WNIC 34 are typically transmitted over the network 102 and may be sent by another network device, for example computer 116. The computer 116 may be located within the same store as the printer or it may be located remotely. In order for the printer 108 to work on the network 102 it must be configured.

When the printer is shipped to a store, or domestic residence, for example, it may be in a state such that it is ready to be configured. If it is to be shipped to a specific store within a chain of stores then it may be configured so as to be generic to all of the stores within that chain. In one example, the storage means 40 has a Network Control Language (NCL) flash file stored on it. An example of such a file is shown in FIG. 6.

Figure 7:
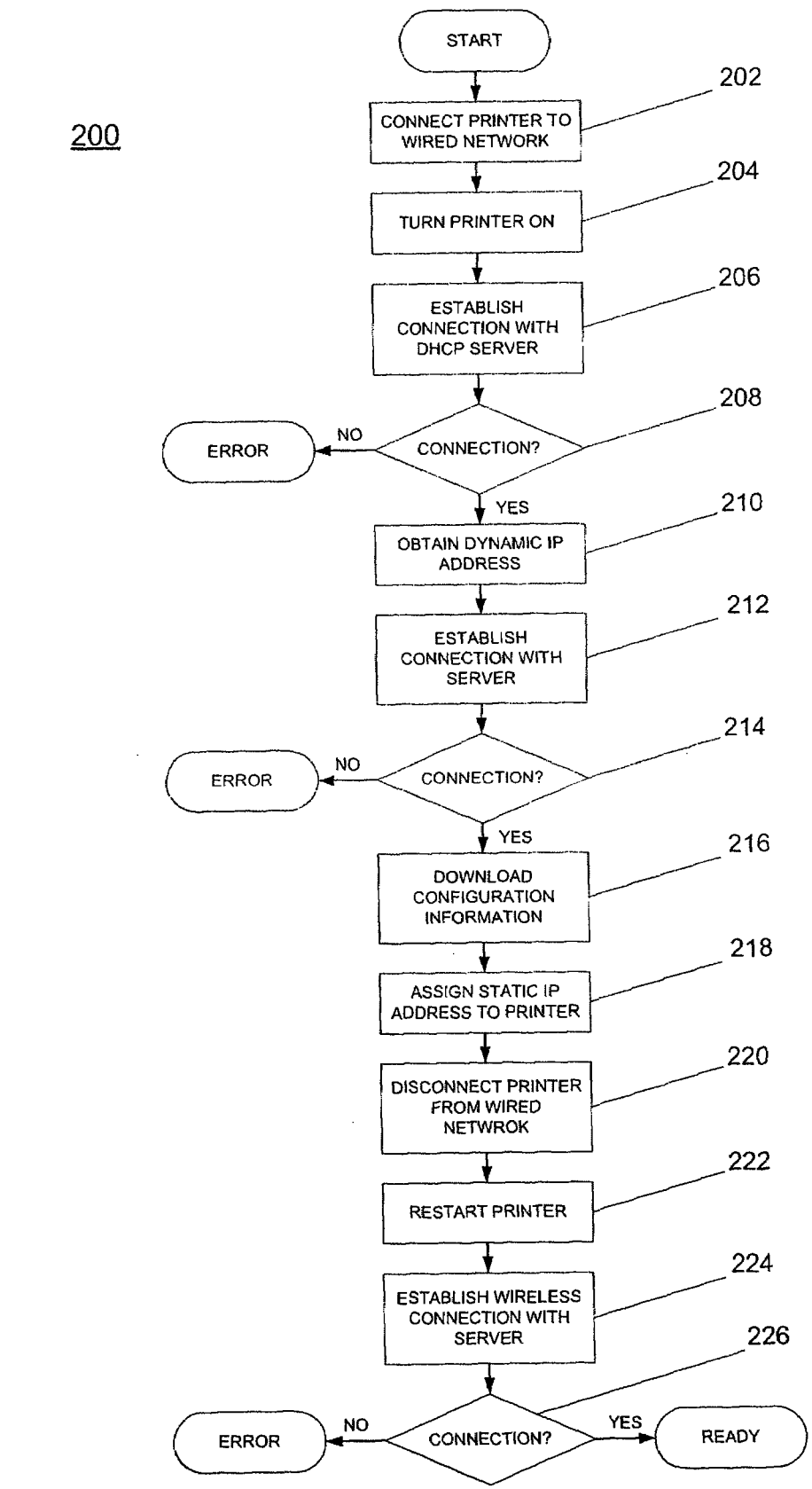
FIG. 7 is a flow chart of a method for configuring a device consistent with certain embodiments of the invention.

FIG. 7 shows an exemplary embodiment of a method for configuring a printer 200 within a specific location, such as a store. Though the term "printer" is used throughout this disclosure it will be apparent to one skilled in the art that any other device may be configured in a similar manner. Examples of such devices include: document scanners, machine readable code scanners (e.g. barcode scanners), and cameras.

This configuration process may only occur the first time the printer, or other device, is turned on. In one embodiment the printer may be the printer 108 described above. In step 202 the printer 108 is connected to a network 102 using a wired connection. This may be done by plugging an Ethernet cable, having an RJ45 plug at each end, into the network port 32 connected to the NIC 30 of the printer 108 and a fixed network point located on a wall of the store, for example. The printer 108 is then turned on 204. Using the wired connection the printer 108 then attempts to establish a connection with a DHCP server 112. If a connection cannot be established 208 then the printer 108 displays an error message on the display 12. If the connection with the DHCP server 112 is successful then the printer obtains a dynamic IP address 210 from the DHCP server 112. A DHCP server is a server that is capable of assigning IP addresses to networked devices while ensuring that no two devices on the network have the same IP address. Though a DHCP server is described in this embodiment, it is possible to use other methods to obtain a dynamic IP address using a wired connection. The DHCP server may issue a dynamic IP address that relates to the store that the printer 108 is to be used in. The dynamic IP address issued may have the same base IP address as the store it is issued from. The base IP address may be in the form of a fixed prefix, e.g. 1.23.45.XXX or 1.23.XX.XXX.

In one embodiment, the NCL flash file illustrated in FIG. 6 may be executed. The purpose of this file is to cause the printer 108 to download the up-to-date installation configuration file from a file server using the dynamic IP address issued by the DHCP server 112. In one embodiment, the name and/or address of the DHCP server is installed onto the device during manufacturing. The dynamic IP address assigned to the printer may have a 'base address' which comprises three fixed octets that are specific to the particular store (e.g. 1.23.45.XXX, the three fixed octets being 1, 23 and 45), for example.

Figure 8:
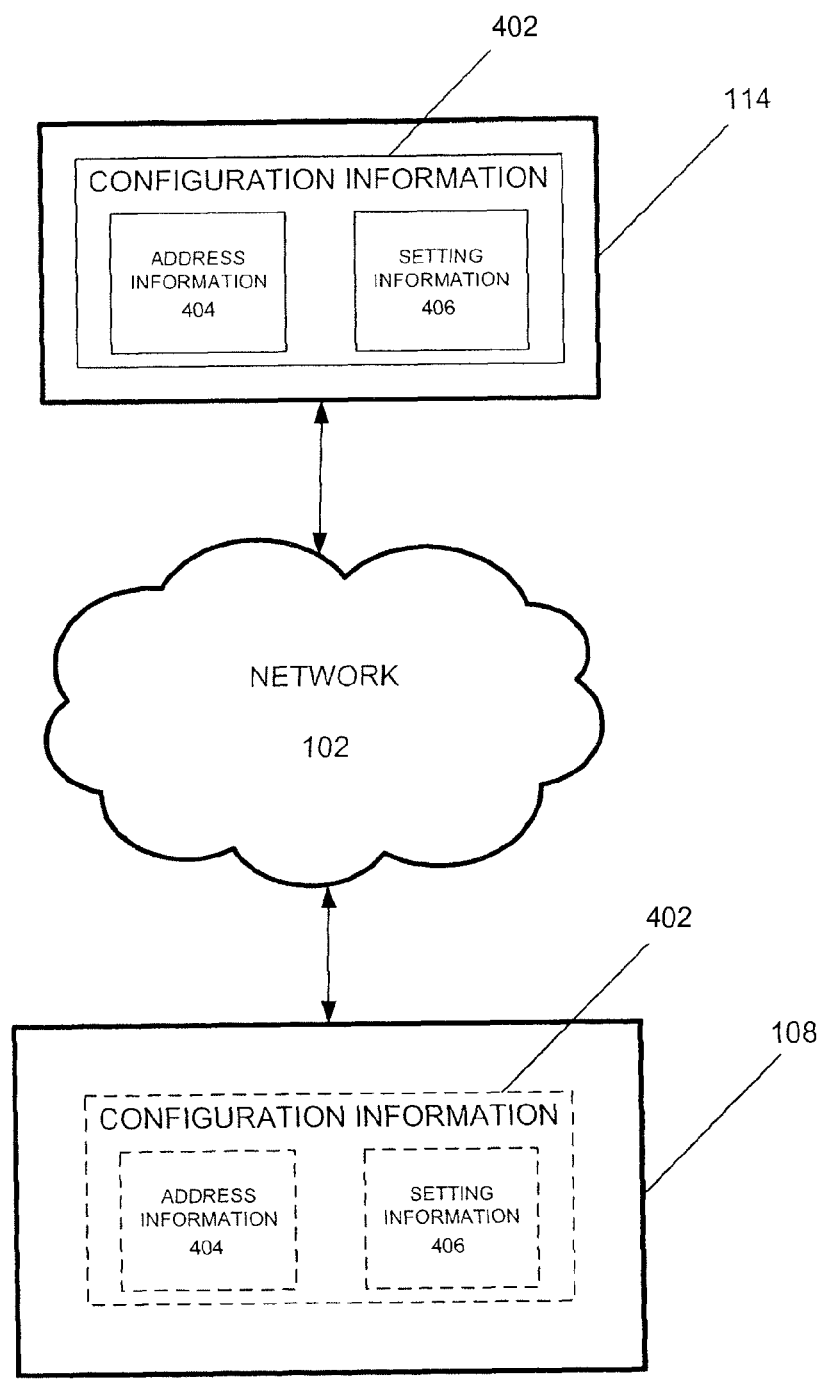
FIG. 8 is a schematic diagram of downloading configuration information to a device from a server consistent with certain embodiments of the invention.

Using the dynamic IP address obtained from the DHCP server 112 and the wired network, connection the printer 108 attempts to establish a connection 212 with a server 114. This server 114 may be located in the specific store, in the main store or any other suitable location. The server 112 and server 114 may be the same device or may be separate. In step 214, if the attempted connection is unsuccessful then the printer 108 displays an error message on the display 12. If the connection with the server 114 is successful then in step 216 configuration information 402 is downloaded from the server 114 to the printer 108 and is stored in the storage device 40. This is schematically shown in FIG. 8.

The configuration information 402 is information that is suitable for configuring the printer. The configuration information 402 may include address information 404 and/or setting information 406. The address information 404 may comprise information for assigning a unique static IP address to the printer. The address information 404 may be specific to the particular store or may be more general, for example, it may relate to a group of stores close together or it may relate to a whole network of stores. The setting information 406 may comprise information for configuring the printer to work on the network. The setting information 406 may be specific to the particular store or may be more general, for example, it may relate to a group of stores close together or it may relate to a whole network of stores.

The address information may comprise a list of unavailable IP addresses. As shown in FIG. 9, in one embodiment the address information 404 comprises a list of printer ID names and corresponding IP addresses for the particular store. In step 218, using the address information 404 a static IP address is assigned to the printer. In this particular embodiment this is done by processing the address information 404 and assigning the next IP address to the printer (e.g. 192.168.0.106). Further, a printer ID may be assigned to the printer. As shown in FIG. 9, this comprises the store ID (e.g. ABCD) followed by a printer number (e.g. 7); the printer number may be assigned to the printer by processing the address information 404 and assigning the next printer number to the printer.

In this embodiment, the printer ID and the static IP address assigned to the printer 108 is written into the address information 404. This may be done by communication with the server 114 or it may be done in the printer 108 itself. If the address information 404 is updated in the printer 108, then the updated address information may uploaded to the server 114. The updated address information uploaded to the server may replace any existing address information on the server or it may simply reside on the server as an updated version of the address information. When another printer seeks to download the address information from the server then the latest version, or the updated version, of the address information is downloaded. Using up-to-date address information ensures that each printer is assigned a unique static IP address. If two printers, or other devices, have the same IP address then a conflict occurs on the network.

Referring to FIG. 10, downloaded setting information 406 may include information on how to configure the printer to work on the network. This setting information 406 may be store specific or may relate to a number of stores, further, it may relate to the whole network of stores. The setting information may include information for setting the format of the printer. Further, it may include information specific to the store such as the name of wireless network of a store and the password for the network.

In one embodiment, on first-boot, after processing the file illustrated in FIG. 6, the printer 108 may download a file containing the store's printer database. An example of such a file is illustrated in FIG. 11. In this particular exemplary file, the line starting [StoreChain] identifies the section that contains several features specific to the chain of stores. Within that section, the line beginning with "Available" identifies a list of available printer numbers. The line starting "Used" is followed by a list of printer numbers already in use. The printer will select the first printer number in the "Available" list as its number and move that number to the "Used" list. The file is then written back to the network server, ready for the next printer to be used. The printer number, assigned to the printer, is saved for later. The section labeled [FileXfr] loads the next file.

The store ID look-up table (referred to as StoreIDLookup.txt in the above example) is searched by the printer until a match is found for the store IP address. This is done by searching for the store IP address having the same 'base' IP address as the 'base' IP address of the dynamic IP address assigned to the printer. For example, searching for the store IP address having the base IP address 1.23.45.XXX.

An example of a store look-up table is shown in FIG. 12. The [StoreChain] section contains the table of store IP addresses coupled with store IDs. The printer searches this table to find a match to its base IP address. When the printer finds a match the printer stores the associated store ID. In the above example, the store ID associated with the base IP address of the printer is TKT00RL125.

In the section [NIC.TCPIP.7411] the printer uses the base IP address and the store ID to calculate and set the printer's static IP address, gateway IP address and network ID. The static IP address may be set by adding an offset to a base IP address. The [FileXfr] section loads two files. The first is an NCL flash file used to reload the printer configuration file the next time the printer boots. The second file is the printer configuration file.

In one example, the printer flash file and configuration file is maintained by the chain of stores so that the printer configuration can be changed as needed. These files may be common to all stores in a chain. An example of such a flash file is shown in FIG. 13. An example of such a configuration file is shown in FIG. 14.

In the file shown in FIG. 13, the [FileXfr] section loads formats into the printer. The printer and network configuration is completed and the NCL flash file, used to reload the configuration file, is requested. If it is desired, a log of printer configuration activity can be uploaded to the network. It is also possible to upload a file that contains the complete configuration information for the printer and network card.

If desired, the printer can save a log of configuration transactions to a network file. The printer can also upload an NCL file containing the complete printer and network configuration.

In one embodiment, once the printer 108 has been configured a message may be displayed on the display 12 of the printer. In step 220, the printer is disconnected from the wired network by removing the Ethernet cable connecting it to a fixed network point. The printer may then be rebooted 222; this may be done by depressing a button (for example on the keypad 14), in another embodiment this may occur automatically.

In another embodiment, the printer can print a completion label at the end of installation so that the installer can verify that the install went correctly. This label can be configured to print from the NCL script.

On restarting, the printer 108 searches for a wireless network associated with the store using the WNIC 34. In step 224, the printer connects to a server via the wireless connection and the static IP address assigned to the printer. If a connection cannot be established 226 then an error message may be displayed on the display 12. If a wireless connection is established 226 then the printer may display that the printer is ready.

Figure 15:
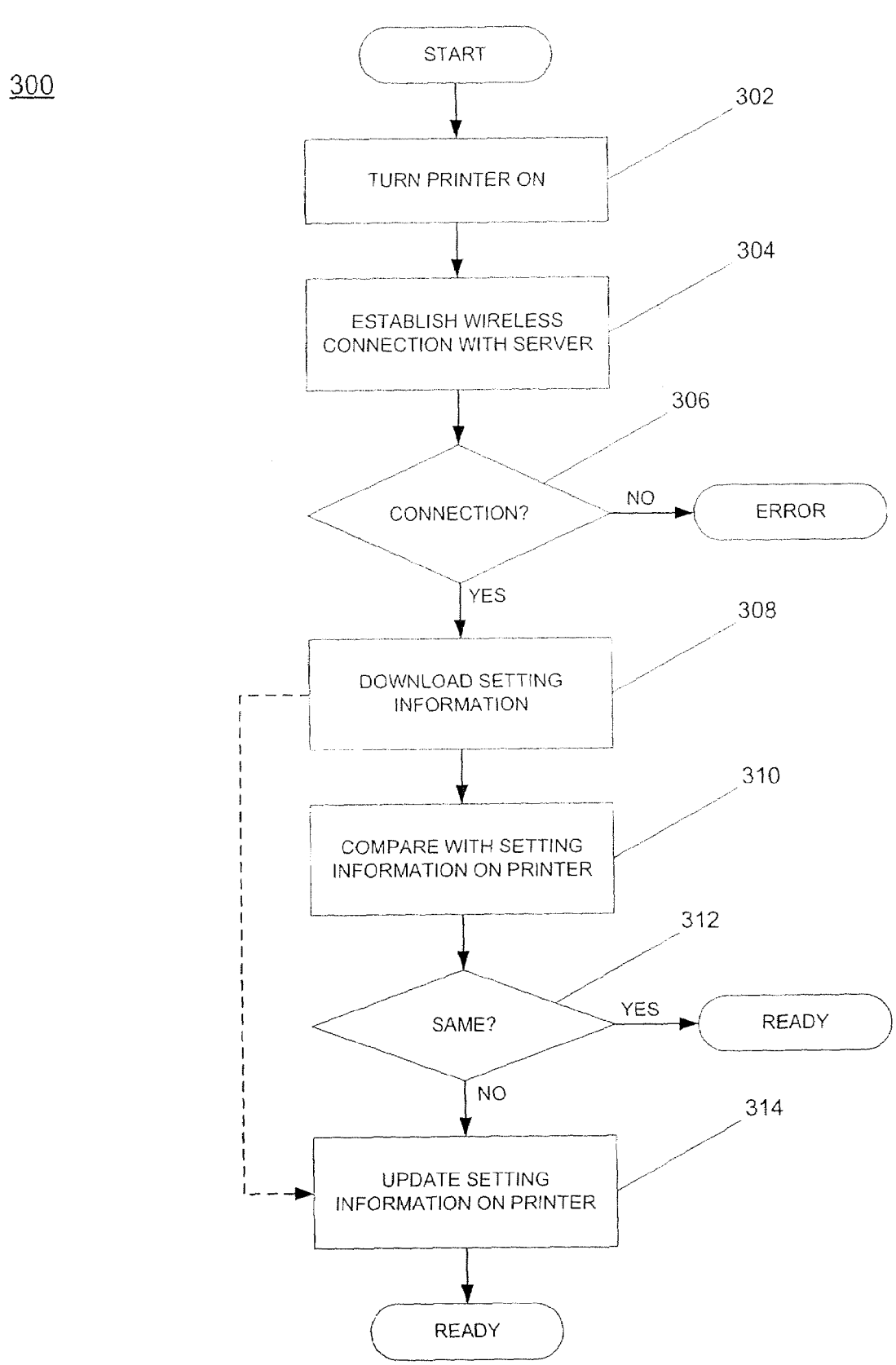
FIG. 15 is a flow chart of a method for updating setting information consistent with certain embodiments of the inventions.

FIG. 15 illustrates an embodiment of a method 300 that may be employed when the printer 108 is switched on after it has been initially configured. In one embodiment, in order to ensure that the setting information 406 is up to date, setting information 406 is downloaded from the server 114 periodically. In the described example, setting information is downloaded from the server 114 every time the printer is turned on. Alternatively, setting information 406 may be pushed from the server 114 to the printer 108, or pulled to the printer 108 from the server 114. This may occur at specified times or may occur only when new setting information 406 is available.

In this embodiment, every time the printer 108 is turned on 302 it attempts to establish a connection with a server 114 using a wireless connection (provided by the WNIC 34) and the static IP address assigned to the printer. If a connection cannot be established 306 then an error message is displayed on the display 12 of the printer 108. If a connection is established 306 then setting information 406 is downloaded 308 from the server. In step 310 this downloaded setting information 406 is compared with the setting information 406 stored on the printer 108 and if they are the same 312 no action is taken and the printer 108 is ready for use. However, if the setting information 406 downloaded is different 312 from the setting information 406 stored on the printer 108 then the downloaded setting information 406 replaces that already on the printer (i.e. the setting information 406 is updated). This ensures that the setting information 406 on the printer is up to date.

In an alternative embodiment, the downloaded setting information 406 replaces the setting information 406 stored on the printer 108 regardless, in other words, steps 310 and 312 are omitted. This also ensures that the setting information 406 on the printer 108 is up to date.

The configuration information may comprise information that is generic to a plurality of stores (for example a chain of stores) and may comprise information that is specific to a particular store, for example the store that the printer is to be used in.

In one embodiment it is possible to reset the printer 108 back to the state it was in when it was shipped (i.e. its unconfigured state). For example, the printer may be reset so that it is only loaded with the NCL flash file illustrated in FIG. 6.

It will be readily apparent to one skilled in the art that it is not essential that method 200 is performed before method 300. In one embodiment, the printer, or other device, may be configured before dispatch to the store or may be configured manually, for example, as opposed to by the steps of method 200. In order to update setting information stored on the device a connection may be established with a server; setting information may be downloaded from the server; and the setting information stored on the device may be replaced with the downloaded setting information.

Further, it will be readily apparent to one skilled in the art that although the above embodiments have been described in terms of a printer and a store, the above described methods may be used to configure any network configurable device for use in any location, for example a domestic location.

I claim:

1. A method of configuring a printer, comprising the steps of:
   (a) obtaining a dynamic IP address using a wired connection;
   (b) establishing a connection with a server using the wired connection and the dynamic IP address;
   (c) downloading configuration information from the server, wherein the configuration information comprises address information and the address information comprises a list of unavailable IP addresses currently assigned to other printers;
   (d) assigning a static IP address to the printer using the configuration information; and
   (e) establishing a connection with a server using a wireless connection and the static IP address.

2. The method of claim 1, wherein the dynamic IP address is obtained from a DHCP server.

3. The method of claim 1, wherein the address information on the server is updated by making the static IP address assigned to the printer unavailable.

4. The method of claim 1, further comprising assigning a unique ID name to the printer.

5. The method of claim 4, wherein the address information further comprises a list of unique printer ID names and the IP address associated with the printer ID names.

6. The method of claim 5, wherein the address information on the server is updated by including within the address information on the server the unique printer ID and the static IP address assigned to the printer.

7. The method of claim 1, wherein the configuration information further comprises setting information.

8. The method of claim 7, wherein the setting information comprises information relating to a wireless network.

9. The method of claim 7, further comprising:
   downloading setting information from the server; and
   replacing the setting information stored on the printer with the downloaded setting information.

10. The method of claim 9, wherein the setting information stored on the printer is only replaced with the downloaded setting information if the setting information stored on the printer is different to the downloaded setting information.

11. The method of claim 1, further comprising after step (c) but prior to step (e), physically disconnecting the printer from the wired connection.

12. A printer of comprising:
   a wired connection port;
   a wireless transceiver;
   a processor; and
   a computer-readable medium having computer-readable instructions, that when executed by the processor perform a method comprising the steps of:
      (a) obtaining a dynamic IP address using a wired connection provided via the wired connection port;
      (b) establishing a connection with a server using the wired connection and the dynamic IP address;
      (c) downloading configuration information from the server, wherein the configuration information comprises address information and the address information comprises a list of unavailable IP addresses currently assigned to other printers;
      (d) assigning a static IP address to the printer using the configuration information; and
      (e) establishing a connection with a server using a wireless connection, provided via the wireless transceiver, and the static IP address.

13. The printer of claim 12, wherein the dynamic IP address is obtained from a DHCP server.

14. The printer of claim 12, wherein the address information on the server is updated by making the static IP address assigned to the printer unavailable.

15. The printer of claim 12, wherein the computer-executable instructions further comprise assigning a unique ID name to the printer.

16. The printer of claim 15, wherein the address information further comprises a list of unique printer ID names and the IP address associated with the printer ID names.

17. The printer of claim 16, wherein the address information on the server is updated by including within the address information on the server the unique printer ID and the static IP address assigned to the printer.

18. The printer of claim 12, wherein the configuration information further comprises setting information.

19. The printer of claim 18, wherein the setting information comprises information relating to a wireless network.

20. The printer of claim 18, wherein the computer-executable instructions further comprise:
   downloading setting information from the server; and
   replacing the setting information stored on the printer with the downloaded setting information.

21. The printer of claim 20, wherein the setting information stored on the printer is only replaced with the downloaded setting information if the setting information stored on the printer is different to the downloaded setting information.

22. The printer of claim 12, further comprising after step (c) but prior to step (e), physically disconnecting the printer from the wired connection.

23. A computer-readable medium having computer-readable instructions, that when executed by a processor perform a method of configuring a printer, comprising the steps of:
   (a) obtaining a dynamic IP address using a wired connection;
   (b) establishing a connection with a server using the wired connection and the dynamic IP address;
   (c) downloading configuration information from the server, wherein the configuration information comprises address information and the address information comprises a list of unavailable IP addresses currently assigned to other printers;
   (d) assigning a static IP address to the printer using the configuration information; and
   (e) establishing a connection with a server using a wireless connection and the static IP address.

24. The computer-readable medium of claim 23, wherein the dynamic IP address is obtained from a DHCP server.

25. The computer-readable medium of claim 23, wherein the address information on the server is updated by making the static IP address assigned to the printer unavailable.

26. The computer-readable medium of claim 23, wherein the computer-executable instructions further comprise assigning a unique ID name to the printer.

27. The computer-readable medium of claim 26, wherein the address information further comprises a list of unique printer ID names and the IP address associated with the printer ID names.

28. The computer-readable medium of claim 27, wherein the address information on the server is updated by including within the address information on the server the unique printer ID and the static IP address assigned to the printer.

29. The computer-readable medium of claim 23, wherein the configuration information further comprises setting information.

30. The computer-readable medium of claim 29, wherein the setting information comprises information relating to a wireless network.

31. The computer-readable medium of claim 29, wherein the computer-executable instructions further comprise:
   downloading setting information from the server; and
   replacing the setting information stored on the printer with the downloaded setting information.

32. The computer-readable medium of claim 31, wherein the setting information stored on the printer is only replaced with the downloaded setting information if the setting information stored on the printer is different to the downloaded setting information.

33. The computer-readable medium of claim 23, further comprising after step (c) but prior to step (e), physically disconnecting the printer from the wired connection.

* * * * *